(12) United States Patent
Gao et al.

(10) Patent No.: US 10,969,650 B2
(45) Date of Patent: Apr. 6, 2021

(54) LIQUID CRYSTAL CELL, DISPLAY AND ELECTRONIC DEVICE

(71) Applicant: BOE TECHNOLOGY GROUP CO., LTD., Beijing (CN)

(72) Inventors: Jian Gao, Beijing (CN); Xue Dong, Beijing (CN); Xiaochuan Chen, Beijing (CN); Yafeng Yang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 112 days.

(21) Appl. No.: 16/329,896

(22) PCT Filed: Mar. 1, 2018

(86) PCT No.: PCT/CN2018/077777
§ 371 (c)(1),
(2) Date: Mar. 1, 2019

(87) PCT Pub. No.: WO2018/166354
PCT Pub. Date: Sep. 20, 2018

(65) Prior Publication Data
US 2019/0196297 A1 Jun. 27, 2019

(30) Foreign Application Priority Data
Mar. 17, 2017 (CN) .......................... 2017 1 0161130

(51) Int. Cl.
*G02F 1/29* (2006.01)
*G02F 1/13* (2006.01)
(Continued)

(52) U.S. Cl.
CPC ............... *G02F 1/29* (2013.01); *G02B 30/27* (2020.01); *G02F 1/1313* (2013.01); *G02F 1/133504* (2013.01); *G02F 1/294* (2021.01)

(58) Field of Classification Search
None
See application file for complete search history.

(56) References Cited

U.S. PATENT DOCUMENTS

2015/0253579 A1    9/2015  Kim et al.

FOREIGN PATENT DOCUMENTS

CN    101025493 A    8/2007
CN    104950544 A    9/2015
(Continued)

OTHER PUBLICATIONS

First Office Action for CN Appl. No. 201710161130.7, dated Sep. 30, 2018.
(Continued)

*Primary Examiner* — Phu Vu
(74) *Attorney, Agent, or Firm* — The Webb Law Firm

(57) ABSTRACT

This disclosure proposes a liquid crystal cell, a display and an electronic device. The liquid crystal cell comprises a first substrate and a second substrate disposed above the first substrate. The first substrate is configured to be formed with a diffraction phase grating array on a surface thereof close to the second substrate, and the diffraction phase grating array is filled with liquid crystal units. The second substrate is configured to comprise stacked first electrode layer, insulating layer and second electrode layer on a side thereof close to the first substrate.

8 Claims, 3 Drawing Sheets

(51) Int. Cl.
*G02F 1/1335* (2006.01)
*G02B 30/27* (2020.01)

(56) References Cited

FOREIGN PATENT DOCUMENTS

| | | |
|---|---|---|
| CN | 204613554 U | 9/2015 |
| CN | 105068354 A | 11/2015 |
| CN | 105929619 A | 9/2016 |
| CN | 106226930 A | 12/2016 |
| CN | 106324898 A | 1/2017 |
| CN | 205992098 U | 3/2017 |
| CN | 206096696 U | 4/2017 |
| CN | 106842598 A | 6/2017 |
| CN | 106918917 A | 7/2017 |
| CN | 107329309 A | 11/2017 |
| CN | 107479248 A | 12/2017 |
| CN | 108037598 A | 5/2018 |

OTHER PUBLICATIONS

International Search Report and Written Opinion for International Appl. No. PCT/CN2018/077777, dated Sep. 28, 2018.
Second Office Action for CN Appl. No. 201710161130.7, dated Jun. 3, 2019.
Third Office Action for CN Appl. No. 201710161130.7, dated Aug. 20, 2019.

LIQUID CRYSTAL CELL, DISPLAY AND ELECTRONIC DEVICE

CROSS-REFERENCE TO RELATED APPLICATIONS

This application is a U.S. National Stage under 35 U.S.C. § 371 of International Application No. PCT/CN2018/077777, as filed on Mar. 1, 2018, which claims priority to Chinese Patent Application No. 201710161130.7, as filed on Mar. 17, 2017. The disclosures of each of these applications are hereby incorporated herein by reference in entirety into this application.

TECHNICAL FIELD

The present invention relates to a liquid crystal cell, a display and an electronic device.

BACKGROUND

With the rapid development of stereoscopic display technologies, there is a growing demand for stereoscopic display devices, and among a large number of technologies for implementing three-dimensional 3D (3 Dimensions) stereoscopic display, naked eye 3D display is popular in the field of three-dimensional stereoscopic display since the viewers thereof do not have to wear eyeglasses.

At present, the mainstream naked eye 3D technical measures comprise slit-type liquid crystal grating and columnar prism. The principle of the slit-type liquid crystal grating is to add a slit-type grating in the front of the screen, such that when the image seen by the left eye is displayed on the liquid crystal screen, opaque stripes will shade the right eye, but when the image seen by the right eye is displayed on the liquid crystal screen, the opaque stripes will shade the left eye. By separating the visible pictures of the left eye from those of the right eye, the viewers will see 3D images. The principle of the columnar prism is to, through the refraction principle of the lens in the liquid crystal cell, project pixel points corresponding to the left and right eyes respectively in the left and right eyes so as to realize image separation.

SUMMARY

According to an embodiment of this disclosure, a liquid crystal cell is proposed, comprising a first substrate and a second substrate facing the first substrate. The first substrate is configured to be formed with a diffraction phase grating array on a surface thereof close to the second substrate, wherein the diffraction phase grating array is filled with liquid crystal units, and the second substrate is configured to comprise stacked first electrode layer, insulating layer and second electrode layer on a side thereof close to the first substrate.

In an embodiment of this disclosure, the diffraction phase grating array comprises a plurality of first phase grating groups and second phase grating groups arranged periodically, and the first phase grating groups and the second phase grating groups are symmetrically distributed relative to a center line of the liquid crystal cell.

In an embodiment of this disclosure, the first phase grating groups and the second phase grating groups each comprise first to Mth grating units, where M is a positive integer.

In an embodiment of this disclosure, each grating unit comprises N steps, where N is $2^m$, and m is a positive integer, and a phase difference between adjacent steps is $2\pi/N$, and a step height is $$h = \frac{\frac{\lambda}{N}}{n_1 - n_o},$$

where $\lambda$ is a wavelength of the incident light, $n_1$ is a refractive index of the first substrate, and $n_o$ is a minimum refractive index of the liquid crystal unit relative to the incident polarized light.

In an embodiment of this disclosure, each of the grating units has a first section and a second section, and the first section of each grating unit has one step, and the second section of each grating unit has N−1 steps.

In an embodiment of this disclosure, a distance from the outermost side of the first section to the center line of the liquid crystal cell is $r_{j,1}$, and a distance from the outermost side of the second section to the center line of the liquid crystal cell is $r_{j,2}$, and $$r_{j,1} = \left[\left(f + \frac{(2j-1)\frac{\lambda}{2}}{n_1}\right)^2 - f^2\right]^{1/2} = \sqrt{\frac{(2j-1)f\lambda}{n_1}}\left(1 + \frac{(2j-1)}{4n_1 f}\right)^{1/2},$$

$$r_{j,2} = \left[\left(f + \frac{j\lambda}{n_1}\right)^2 - f^2\right]^{1/2} = \sqrt{\frac{2jf\lambda}{n_1}}\left(1 + \frac{j\lambda}{2n_1 f}\right)^{1/2},$$

where f is an object focal length of the liquid crystal cell when the liquid crystal unit has a minimum refractive index relative to the incident polarized light.

In an embodiment of this disclosure, in the jth grating unit, a width of the step on the first section is $$t_{j,1} = d_{j,1} - \sum_{i=1}^{m-1} \frac{d_{j,2}}{2^i},$$

and a width of the step on the second section is $$t_{j,2} = \frac{d_{j,2}}{N/2},$$

where j is a positive integer less than or equal to M, $d_{j,1}=r_{j,1}-r_{j-1,2}$, $d_{j,2}=r_{j,2}-r_{j,1}$.

In an embodiment of this disclosure, one of the first electrode layer and the second electrode layer close to the diffraction phase grating array comprises a plurality of electrode strips.

In an embodiment of this disclosure, the first electrode layer and the second electrode layer each comprise a transparent electrode.

In an embodiment of this disclosure, by controlling whether a predetermined voltage is applied to the first electrode layer and the second electrode layer, the refractive index of the liquid crystal unit relative to the incident polarized light switches between the minimum refractive index and the maximum refractive index, wherein the maximum refractive index is equal to a refractive index of the first substrate relative to the incident polarized light.

In an embodiment of this disclosure, the liquid crystal cell further comprises a polarizer on a light incident side of the liquid crystal cell, and the incident polarized light is formed through the polarizer.

According to another embodiment of this disclosure, the diffraction phase grating array can be formed on the surface of the second substrate, while the stacked first electrode layer, insulating layer and second electrode layer can be formed on a side of the first substrate. The liquid crystal cell according to the embodiment comprises: a first substrate; and a second substrate facing the first substrate. The first substrate is configured to comprise stacked first electrode layer, insulating layer and second electrode layer on a side thereof close to the second substrate, and the second substrate is configured to be formed with a diffraction phase grating array on a surface thereof close to the first substrate, wherein the diffraction phase grating array is filled with liquid crystal units.

The embodiment of this disclosure proposes a display, comprising a display panel, and the liquid crystal cell according to the embodiment of this disclosure disposed above the display panel.

The embodiment of this disclosure proposes an electronic device, comprising the display according to the embodiment of this disclosure.

Additional aspects and advantages of this disclosure will be given in part in the following description, a part of which will become apparent from the following description, or will be learned through the practice of this disclosure.

BRIEF DESCRIPTION OF THE DRAWINGS

The above and/or additional aspects and advantages of this disclosure will become apparent and easily understood from the description of the embodiments below with reference to the accompanying drawings, wherein.

DETAILED DESCRIPTION

Figure 1:
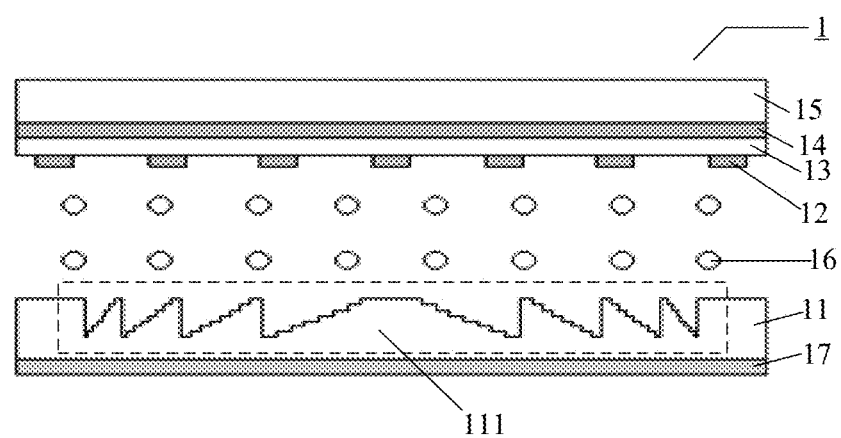
FIG. 1 is a schematic diagram showing a partial section structure of a liquid crystal cell 1 according to one or more embodiment of this disclosure.

The embodiments of this disclosure are described in detail below, and examples of the embodiments are shown in the drawings, wherein the same or similar numerical signs represent the same or similar components or components with the same or similar functions throughout this disclosure. The embodiments described below with reference to the drawings are exemplary and are used only to interpret this disclosure and cannot be construed as limitations to this disclosure.

The liquid crystal, display and electronic device according to the embodiments of this disclosure are described below with reference to accompanying drawings.

FIG. 1 is a schematic diagram showing a partial section structure of a liquid crystal cell 1 according to one or more embodiment of this disclosure.

As shown in FIG. 1, the liquid crystal cell 1 according to an embodiment of this disclosure can comprise a first substrate 11; a first electrode layer 12 disposed above the first substrate 11; an insulating layer 13 disposed above the first electrode layer 12; a second electrode layer 14 disposed above the insulating layer 13; and a second substrate 15 disposed above the second electrode layer 14. Those skilled in the art could appreciate that, the said "above" and "under" directions are relative. In FIG. 1, the direction of the incident light entering the liquid crystal cell 1 is from the bottom to up, and when the direction of the incident light entering the liquid crystal cell 1 is from up to bottom, the liquid crystal cell 1 can be inverted upside down. In general, in the embodiments of the present disclosure, the second substrate 15 faces the first substrate 11.

The first substrate 11 is formed with a diffraction phase grating array 111 on a surface thereof close to the second substrate 15, and the diffraction phase grating array 111 is filled with liquid crystal units 16.

In an embodiment of this disclosure, the diffraction phase grating array 111 can comprise a plurality of first phase grating groups 111a and second phase grating groups 111b arranged periodically, and the first phase grating groups 111a and the second phase grating groups 111b are symmetrically distributed relative to a center line of the liquid crystal cell 1.

Figure 2:
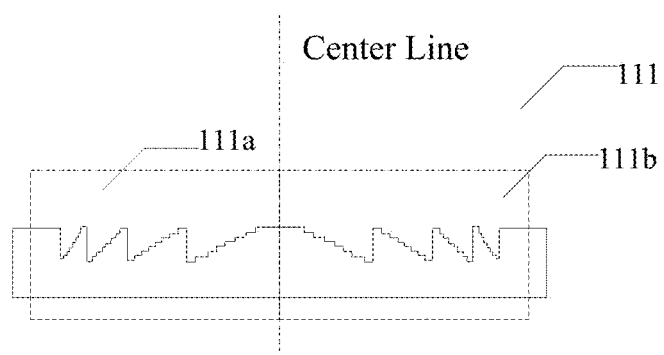
FIG. 2 is a schematic diagram showing a structure of a diffractive phase grating array 111 according to one or more embodiment of this disclosure.

FIG. 2 is a schematic diagram showing a structure of a diffraction phase grating array 111 corresponding to one period.

The first phase grating groups 111a and the second phase grating groups 111b each comprises first to Mth grating units, where M is a positive integer.

For example, for the diffraction phase grating array 111 in FIG. 2, the first phase grating group 111a and the second phase grating group 111b each comprise four grating units.

Each grating unit includes N steps, where N is $2^m$, and m is a positive integer.

For each grating unit, a phase difference between adjacent steps is $2\pi/N$, and a step height is $$h = \frac{\lambda/N}{n_1 - n_o},$$

where $\lambda$ is a wavelength of the incident light, $n_1$ is a refractive index of the first substrate 11, and $n_o$ is a minimum refractive index of the liquid crystal unit 16 relative to the incident polarized light.

In an embodiment of this disclosure, the jth grating unit has a first section and a second section, wherein a distance from the outermost side of the first section to the center line of the liquid crystal cell 1 is $r_{j,1}$, and a distance from the outermost side of the second section to the center line of the liquid crystal cell 1 is $r_{j,2}$, where j is a positive integer less than or equal to M.

$$r_{j,1} = \left[\left(f + \frac{(2j-1)\lambda/2}{n_1}\right)^2 - f^2\right]^{1/2} = \sqrt{\frac{(2j-1)f\lambda}{n_1}}\left(1 + \frac{(2j-1)\lambda}{4n_1 f}\right)^{1/2}$$

$$r_{j,2} = \left[\left(f + \frac{j\lambda}{n_1}\right)^2 - f^2\right]^{1/2} = \sqrt{\frac{2jf\lambda}{n_1}}\left(1 + \frac{j\lambda}{2n_1 f}\right)^{1/2},$$

Equation (1)

where f is an object focal length of the lens, $n_1$ is a refractive index of the medium of the first substrate 11, and f is a focal length of the liquid crystal cell when functioning as a diffractive columnar lens.

Figure 3:
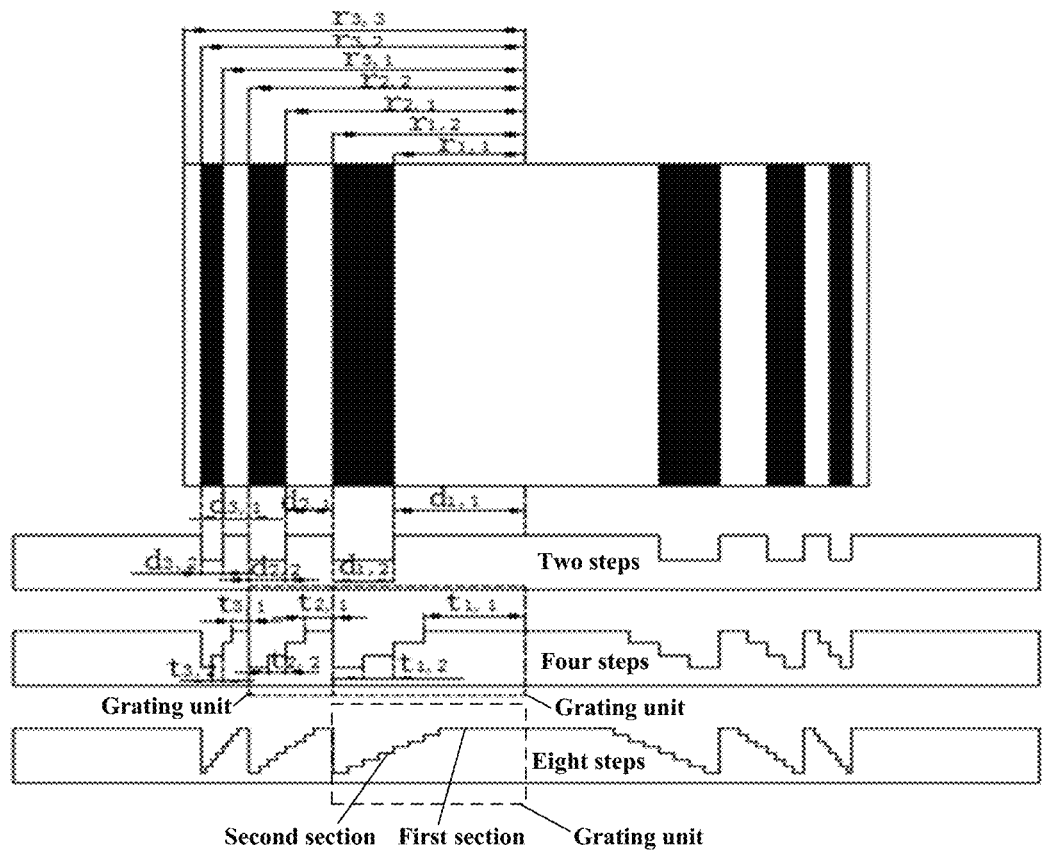
FIG. 3 is a schematic diagram showing a partial section structure of a diffractive phase grating array 111 in which each grating unit comprises two steps, four steps and eight steps, according to one or more embodiment of this disclosure.

The first section of each grating unit has one step, and the second section of each grating unit has a plurality of steps. For example, assume that the first phase grating group 111a and the second phase grating group 111b each comprise three grating units. FIG. 3 is a schematic diagram showing a partial section structure of the diffraction phase grating array 111 in which each grating unit comprises two steps, four steps and eight steps, respectively. As can be seen from FIG. 3, for a grating unit with two steps, there is one step on the first section and one step on the second section; for a grating unit with four steps, there is one step on the first section and three steps on the second section; for a grating unit with eight steps, there is one step on the first section and seven steps on the second section. The top of FIG. 3 is a top view of the first substrate corresponding to the example in which each grating unit comprises two steps, and the black portions in the figure are recessed step portions.

It should be understood that, each grating unit in the embodiment has N steps such that a groove can be formed in each grating unit, and by filling the diffraction phase grating array 111 with the liquid crystal units 16, the groove of the grating unit can be filled fully with the liquid crystal units 16.

In an embodiment of this disclosure, the width of the consecutive N−1 steps on the second section of each grating unit is the same, and the width of the remaining one step on the first section is different from the width of the N−1 steps. The width of the consecutive N−1 steps on the second section of the jth grating unit is as follows $$t_{j,2} = \frac{d_{j,2}}{N/2},$$

Equation (2)

and the width of the remaining one step on the first section in the jth grating unit is as follows $$t_{j,1} = d_{j,1} - \sum_{i=1}^{m-1}\frac{d_{j,2}}{2^i},$$

Equation (3)

where $d_{j,1} = r_{j,1} - r_{j-1,2}$, $d_{j,2} = r_{j,2} - r_{j,1}$. That is to say, the jth grating unit has N−1 steps with a width $t_{j,2}$ and a step with a width $t_{j,1}$.

For example, assume that the first phase grating group 111a and the second phase grating group 111b each comprise three grating units. FIG. 3 is a schematic diagram showing a partial section structure of the diffraction phase grating array 111 in which each grating unit comprises two steps, four steps and eight steps, respectively. As can be seen from FIG. 3, when each grating unit comprises two steps, the distribution of step widths of the diffraction phase grating array 111 is the same with the distribution of step widths of the Fresnel waveband, that is, the width of each step is the same as the width of the corresponding Fresnel waveband. When each grating unit comprises four steps, it can be determined according to the equation for solving the step width that, the width of the step on the first section of the first grating unit which is different from the remaining three steps is $$t_{1,1} = d_{1,1} - \frac{d_{1,2}}{2},$$

and the width of each of the remaining three steps on the second section is $$t_{1,2} = \frac{d_{1,2}}{2}.$$

The width of the step on the first section of the second grating unit which is different from the remaining three steps is $$t_{2,1} = d_{2,1} - \frac{d_{2,2}}{2},$$

and the width of each of the remaining three steps on the second section is $$t_{2,2} = \frac{d_{2,2}}{2}.$$

The width of the step on the first section of the third grating unit which is different from the remaining three steps is $$t_{3,1} = d_{3,1} - \frac{d_{3,2}}{2},$$

and the width of each of the remaining three steps on the second section is $$t_{3,2} = \frac{d_{3,2}}{2}.$$

It should be understood that, as to FIG. 3, the widths of the steps can also be calculated through Equations (2) and (3) when each grating unit comprises eight steps, which is not repeated here.

In an embodiment of this disclosure, when the diffraction phase grating array 111 is disposed on the first substrate 11, the first electrode layer 12 comprises a plurality of electrode strips.

In another embodiment of this disclosure, the first electrode layer 12 and the second electrode layer 14 each can comprise transparent electrodes.

For example, the transparent electrodes in the first electrode layer 12 can be strip electrodes, and the transparent electrodes in the second electrode layer 14 can be surface electrodes.

In an embodiment of this disclosure, when no voltage is applied to the first electrode layer 12 and the second electrode layer 14, the liquid crystal cell 1 can function as a diffraction lens for the incident polarized light.

Specifically, when no voltage is applied to the first electrode layer 12 and the second electrode layer 14, the liquid crystal deflection state of the liquid crystal units 16 in the liquid crystal cell 1 is shown in FIG. 1. When no voltage is applied to the first electrode layer 12 and the second electrode layer 14, if an initial alignment of a long axis of the liquid crystal molecules in the liquid crystal unit is perpendicular to a polarization direction of the incident polarized light, then the refractive index of the liquid crystal molecules in the liquid crystal unit 16 is at the minimum refractive index relative to the incident polarized light, that is, the liquid crystal unit 16 is in a low refractive index state relative to the incident polarized light. Moreover, the minimum refractive index is less than the refractive index of the first substrate 11 relative to the incident polarized light. At this time, the liquid crystal cell 1 function as a diffraction lens.

In an embodiment of this disclosure, when a predetermined voltage is applied to the first electrode layer 12 and the second electrode layer 14, the liquid crystal cell 1 can function as a flat glass with respect to the incident polarized light.

Figure 4:
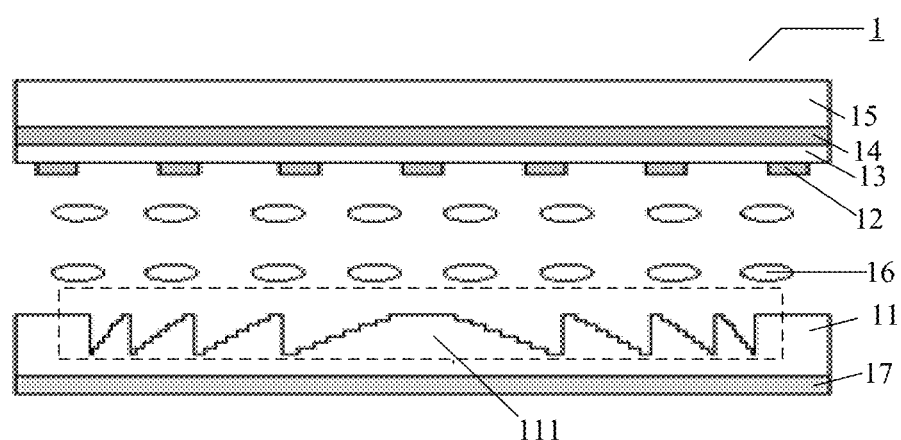
FIG. 4 is a schematic diagram showing a partial section structure of the liquid crystal cell 1 when a predetermined voltage is applied to the first electrode layer and the second electrode layer, according to one or more embodiment of this disclosure.

Specifically, when a predetermined voltage is applied to the first electrode layer 12 and the second electrode layer 14, the liquid crystal deflection state corresponding to the liquid crystal unit 16 in the liquid crystal cell 1 is shown in FIG. 4. It can be seen that when the predetermined voltage is applied to the first electrode layer 12 and the second electrode layer 14, the liquid crystal molecules in the liquid crystal unit turn due to the electric field, and at this time if the alignment of the long axis of the liquid crystal molecules in the liquid crystal unit is parallel to the polarization direction of the incident polarized light, the refractive index of the liquid crystal molecules in the liquid crystal unit 16 is at the maximum refractive index relative to the incident polarized light, that is, the liquid crystal unit 16 is in a high refractive index state relative to the incident polarized light. At this time, the high refractive index of the liquid crystal molecules relative to the incident polarized light is equal to the refractive index of the first substrate 11. This is equivalent to fill the groove of the diffraction gratings on the first substrate 11 with liquid crystal molecules, so the liquid crystal cell 1 at this time functions as a flat glass.

In an embodiment of this disclosure, the polarized light incident to the liquid crystal cell 1 has a fixed polarization direction. For example, the incident polarized light can be the polarized light from, for example, a liquid crystal display panel. In an embodiment of this disclosure, in order to obtain the polarized light with a fixed polarization direction, a polarizer 17 can be arranged on the incident light side of the liquid crystal cell 1, and the transmission axis of the polarizer 17 is configured to be perpendicular to the initial alignment of the long axis of the liquid crystal unit 16 when no voltage is applied to the first electrode layer 12 and the second electrode layer 14.

In some embodiments of this disclosure, the alignment of the long axis of the liquid crystal molecules in the liquid crystal unit can be set to be parallel to the polarization direction of the incident polarized light when no voltage is applied to the first electrode layer 12 and the second electrode layer 14, and the refractive index of the liquid crystal molecules relative to the incident polarized light is at the maximum refractive index. When a predetermined voltage is applied to the first electrode layer 12 and the second electrode layer 14, the liquid crystal molecules in the liquid crystal unit turn due to the electric field, and at this time the long axis of the liquid crystal molecules in the liquid crystal unit is perpendicular to the polarization direction of the incident polarized light, and the refractive index of the liquid crystal molecules relative to the incident polarized light is at the minimum refractive index. Therefore, in the embodiment of this disclosure, when no voltage is applied to the first electrode layer 12 and the second electrode layer 14, the liquid crystal cell 1 can function as a flat glass with respect to the incident polarized light, and when the predetermined voltage is applied to the first electrode layer 12 and the second electrode layer 14, the liquid crystal cell 1 can function as a diffraction columnar lens with respect to the incident polarized light.

For the liquid crystal cell in the embodiment of this disclosure, by arranging the diffraction phase grating array on the first substrate or the second substrate, and filling the diffraction phase grating array with the liquid crystal units, a liquid crystal cell with a simple structure is proposed, to facilitate the subsequent use thereof in combination with the display panel, so as to realize the display effect in which 2D and 3D displays are switchable.

Figure 5:
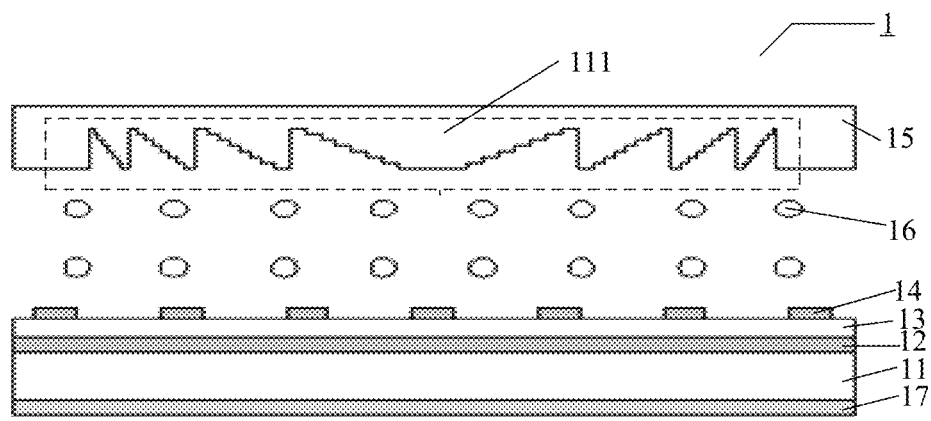
FIG. 5 is a schematic diagram showing a partial section structure of a liquid crystal cell 1 according to one or more embodiment of this disclosure.

FIG. 5 is a schematic diagram showing a partial section structure of a liquid crystal cell 1 according to another embodiment of this disclosure.

As shown in FIG. 5, the liquid crystal cell 1 can comprise: a first substrate 11; a first electrode layer 12 disposed above the first substrate 11; an insulating layer 13 disposed above the first electrode layer 12; a second electrode layer 14 disposed above the insulating layer 13; and a second substrate 15 disposed above the second electrode layer 14.

The second substrate 15 is formed with a diffraction phase grating array 111 on a surface thereof close to the first substrate 11, and the diffraction phase grating array 111 is filled with liquid crystal units 16.

It should be noted that, the liquid crystal cell 1 shown in FIG. 5 differs from the liquid crystal cell 1 shown in FIG. 1 in that, the second substrate 15 is formed with a diffraction phase grating array 111 on a surface thereof close to the first substrate 11, but the principle of the implementation and the effect thereof are the same as those in the technical solution of the above embodiment, and are omitted here. Therefore, in this embodiment, similar to the liquid crystal cell 1 shown in FIG. 1, the second substrate 15 faces the first substrate 11 as well.

In an embodiment of this disclosure, when the diffraction phase grating array 111 is disposed on the second substrate 15, the second electrode layer 14 comprises a plurality of electrode strips.

In an embodiment of this disclosure, the first electrode layer 12 and the second electrode layer 14 each can comprise transparent electrodes.

For example, the transparent electrodes in the first electrode layer 12 can be strip electrodes, and the transparent electrodes in the second electrode layer 14 can be surface electrodes.

In an embodiment of this disclosure, when no voltage is applied to the first electrode layer 12 and the second electrode layer 14, the liquid crystal cell 1 functions as a diffraction lens.

It should be noted that, when the second substrate 15 has the diffraction phase grating array 111, $n_1$ in Equation 1 is the refractive index of the medium on the object side in which the second substrate 15 is disposed.

Specifically, when no voltage is applied to the first electrode layer 12 and the second electrode layer 14, the refractive index of the liquid crystal unit 16 relative to the incident polarized light is in a low refractive index, that is, the liquid crystal unit 16 is at a low refractive index state relative to the incident polarized light. At this time, the liquid crystal cell 1 functions as a diffraction lens.

In an embodiment of this disclosure, when a predetermined voltage is applied to the first electrode layer 12 and the second electrode layer 14, the liquid crystal cell functions as a flat glass.

When the predetermined voltage is applied to the first electrode layer 12 and the second electrode layer 14, the liquid crystal molecules in the liquid crystal unit 16 rotate, such that the refractive index of the liquid crystal unit 16 relative to the incident polarized light is at a high refractive index, that is, the liquid crystal unit 16 is in a high refractive index state relative to the incident polarized light, and the high refractive index of the liquid crystal molecules relative to the incident polarized light is equal to the refractive index of the second substrate 15. This is equivalent to fill the diffraction grating on the second substrate 15 with the liquid crystal molecules, so the liquid crystal cell 1 at this time functions as a flat glass.

In other words, by controlling whether a predetermined voltage is applied to the first electrode layer 12 and the second electrode layer 14 in the embodiment, the refractive index of the liquid crystal unit relative to the incident polarized light can be switched between the minimum refractive index and the maximum refractive index, so that the liquid crystal cell 1 switches between the function of the diffraction lens and the function of the flat glass.

Figure 6:
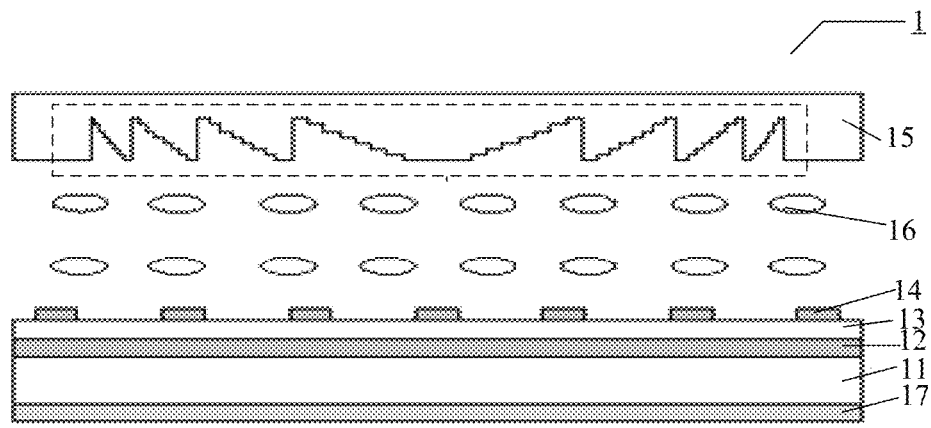
FIG. 6 is a schematic diagram showing a partial section structure of the liquid crystal cell 1 when a predetermined voltage is applied to the first electrode layer and the second electrode layer, according to one or more embodiment of this disclosure.

For example, assuming that when no voltage is applied to the first electrode layer 12 and the second electrode layer 14, the liquid crystal deflection state corresponding to the liquid crystal unit 16 in the liquid crystal cell 1 is shown in FIG. 5, and when a predetermined voltage is applied to the first electrode layer 12 and the second electrode layer 14, the liquid crystal deflection state of the liquid crystal unit 16 in the liquid crystal cell 1 is shown in FIG. 6.

Similar to the previous embodiments, the alignment of the long axis of the liquid crystal molecules in the liquid crystal unit is set to be perpendicular to the polarization direction of the incident polarized light when no voltage is applied to the first electrode layer 12 and the second electrode layer 14, and to be parallel to the polarization direction of the incident polarized light when the predetermined voltage is applied to the first electrode layer 12 and the second electrode layer 14. Therefore, in the embodiment of this disclosure, when no voltage is applied to the first electrode layer 12 and the second electrode layer 14, the liquid crystal cell 1 can function as a flat glass with respect to the incident polarized light, and when the predetermined voltage is applied to the first electrode layer 12 and the second electrode layer 14, the liquid crystal cell 1 can function as a diffractive columnar lens with respect to the incident polarized light.

According to the above embodiments, when the diffraction phase grating array is formed on the first substrate 11, the first electrode layer 12, the insulating layer 13 and the second electrode layer 14 are disposed on the side of the second substrate 15 close to the first substrate 11. While the diffraction phase grating array is formed on the second substrate 15, the first electrode layer 12, the insulating layer 13 and the second electrode layer 14 are formed on the side of the first substrate 11 close to the second substrate 15. Thus, one of the first substrate and the second substrate is formed with a diffraction phase grating array on a surface thereof close to the other, and the other of the first substrate and the second substrate is configured to comprise the stacked first electrode layer, insulating layer and second electrode layer, on a side thereof close to the one of the first substrate and the second substrate which is formed with the diffraction phase grating array. Moreover, the one of the first electrode layer and the second electrode layer close to the diffraction phase grating array comprises a plurality of electrode strips and the other thereof can be a surface electrode.

In addition, $n_1$ is the refractive index of the one of the first substrate and the second substrate which is formed with the diffraction phase grating array.

In order to implement the above embodiments, this disclosure further proposes a display.

Figure 7:
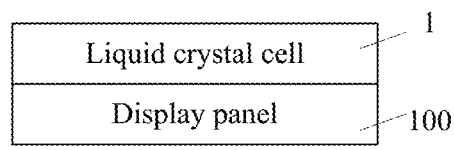
FIG. 7 is a schematic diagram showing a structure of a display according to one or more embodiment of this disclosure.

FIG. 7 is a schematic diagram showing a structure of the display according to an embodiment of this disclosure.

As shown in FIG. 7, the display according to the embodiment of this disclosure comprises a display panel 100 and a liquid crystal cell 1 disposed above the display panel.

It should be noted that, the aforementioned description of the liquid crystal cell 1 also applies to the embodiment, which is not repeated here.

The display panel 100 can be a LCD (Liquid crystal display) or OLED (organic light-emitting diode).

In an embodiment of this disclosure, the transmission shaft on a light exit side of the display panel is configured to be perpendicular to the initial alignment of the long axis of the liquid crystal molecules in the liquid crystal unit. At this time, in case where no voltage is applied to the first electrode layer and the second electrode layer, the liquid crystal molecules in the liquid crystal unit has a low refractive index relative to the incident polarized light, and the liquid crystal cell functions as a diffractive columnar lens array. Therefore, in combination with the display panel, the display can achieve a 3D display function.

In addition, in case where a predetermined voltage is applied to the first electrode layer and the second electrode layer, the liquid crystal molecules in the liquid crystal unit rotate such that the liquid crystal molecules in the liquid crystal unit have a high refractive index relative to the incident polarized light, and the liquid crystal cell functions as a flat glass. At this time, in combination with the display panel, the display can achieve a 2D display function.

It should be understood that, similar to the above embodiments, when the transmission shaft on a light exit side of the display panel is parallel to the initial alignment of the long axis in the liquid crystal unit, it can also be that a 3D display is achieved when a predetermined voltage is applied to the electrodes, and a 2D display is achieved when no voltage is applied to the electrodes.

It should be noted that, in some cases it is not necessary to determine the initial alignment of the liquid crystal units, and whether the initial alignment of the liquid crystal units is made is related to the shape of the liquid crystal units. For example, if the liquid crystal unit is a blue-phase liquid crystal molecular material, since its molecular initial state is spherical, it is not needed to make initial alignment.

In the case where the light emitted from the display panel is not a polarized light, a polarizer can be added on the light incident side of the liquid crystal cell 1, and the initial alignment of the long axis of the liquid crystal molecules in the liquid crystal unit can be set according to the transmission direction of the polarizer.

The display according to the embodiment of this disclosure can achieve switching between 2D and 3D through the cooperation of the display panel and the liquid crystal cell on the display panel.

In order to implement the above embodiments, this disclosure further proposes an electronic device comprising a display according to one or more embodiments of this disclosure.

The electronic device according to the embodiment of this disclosure can achieve switching between 2D and 3D through the cooperation of the display panel and the liquid crystal cell on the display panel.

In the description of this disclosure, it should be noted that, azimuth or position relationship indicated by the terms "center", "longitudinal", "lateral", "length", "width", "thickness", "up", "down", "front", "back", "left", "right", "vertical", "horizontal", "top", "bottom", "inside", "outside", "clockwise", "counterclockwise", "axial", "radial", "circumferential", etc., are the azimuth or position relationships shown based on the drawings, and are intended only to facilitate the description of the disclosure and simplification of the description, instead of indicating or implying that the means or components mentioned must have the specific azimuths or be configured and operated in the specific azimuths, and thus cannot be construed as limitations to the this disclosure.

In the description of this specification, the references terms "one embodiment", "some embodiments", "example", "concrete example", or "some examples" mean that specific features, structures, materials, or characteristics described in conjunction with the embodiment or example are included in at least one embodiment or example of this disclosure. In the description, the illustrative expressions of the above terms are not necessarily directed to the same embodiment or example. Furthermore, the specific features, structures, materials, or characteristics described can be combined in an appropriate manner in any one or more embodiments or examples. In addition, without contradictions, those skilled in the art can join and combine together the different embodiments or examples described in the description, as well as the features of the different embodiments or examples.

In addition, the terms "first" and "second" are used only for descriptive purposes and cannot be construed as indicating or implying relative importance or implicitly indicating the number of technical features mentioned. Thus, features limited with "first" and "second" may include at least one of the features, either explicitly or implicitly. In the description of this disclosure, the meaning of "a plurality of" is two or more, unless otherwise expressly specified.

In this disclosure, unless otherwise expressly specified or defined, the terms such as "mounting", "connected", "connecting" and "fixed" should be understood broadly, for example, it may be a fixed connection or a detachable connection, or integrated; it may be a mechanical connection or an electrical connection; it may be a direct connection, an indirect connection through an intermediate media, or a communication within two components or an interaction between two components, unless otherwise expressly defined. For those skilled in the art, the specific meanings of the above terms in this disclosure can be understood on a case-by-case basis.

In this disclosure, unless otherwise expressly specified and defined, the first feature "above" or "under" the second feature may be the first feature in direct contact with the second feature, or the first feature in indirect contact with the second feature through an intermediate media. Moreover, the first feature "above", "over" and "on" the second feature may be the first feature rightly or obliquely above the second feature, or simply the first feature with a level height higher than the second feature. The first feature "under", "below" and "lower than" the second feature may be the first feature rightly or obliquely below the second feature, or simply the first feature with a level height less than the second feature.

In the description of this specification, the references terms "one embodiment", "some embodiments", "example", "concrete example", or "some examples" mean that specific features, structures, materials, or characteristics described in conjunction with the embodiment or example are included in at least one embodiment or example of this disclosure. In the description, the illustrative expressions of the above terms are not necessarily directed to the same embodiment or example. Furthermore, the specific features, structures, materials, or characteristics described can be combined in an appropriate manner in any one or more embodiments or examples. In addition, without contradictions, those skilled in the art can join and combine together the different embodiments or examples described in the description, as well as the features of the different embodiments or examples.

Although the embodiments of this disclosure have been shown and described above, it can be appreciated that the above embodiments are exemplary and cannot be construed as limitations to this disclosure, and those skilled in the art could change, modify, replace and vary the above embodiments within the scope of this disclosure.

What is claimed is:

1. A liquid crystal cell, comprising:
    a first substrate; and
    a second substrate facing the first substrate;
    wherein the first substrate is configured to be formed with a diffraction phase grating array on a surface thereof close to the second substrate, and the diffraction phase grating array is filled with liquid crystal units,
    wherein the second substrate is configured to comprise a first electrode layer, an insulating layer and a second electrode layer stacked on a side thereof close to the first substrate,
    wherein the diffraction phase grating array is configured to comprise a plurality of first phase grating groups and second phase grating groups arranged periodically, and the first phase grating groups and the second phase grating groups are symmetrically distributed relative to a center line of the liquid crystal cell,
    wherein the first phase grating groups and the second phase grating groups each comprise first to Mth grating units, where M is a positive integer,
    wherein each of the grating units comprises N steps, where N is $2^m$, and m is a positive integer, and a phase difference between adjacent steps is $2\pi/N$, and a step height is $$h = \frac{\lambda/N}{n_1 - n_o},$$

where $\lambda$ is a wavelength of incident polarized light, $n_1$ is a refractive index of the first substrate, and $n_o$ is a minimum refractive index of the liquid crystal unit relative to the incident polarized light, wherein each of the grating units has a first section and a second section, and the first section of each of the grating units has one step, and the second section of each of the grating units has N-1 steps, and wherein a distance from an outermost side of the first section to a center line of the liquid crystal cell is $r_{j,1}$, and a distance from an outermost side of the second section to the center line of the liquid crystal cell is $r_{j,2}$, and $$r_{j,1} = \left[\left(f + \frac{(2j-1)\lambda/2}{n_1}\right)^2 - f^2\right]^{1/2} = \sqrt{\frac{(2j-1)f\lambda}{n_1}}\left(1 + \frac{(2j-1)\lambda}{4n_1 f}\right)^{1/2},$$

$$r_{j,2} = \left[\left(f + \frac{j\lambda}{n_1}\right)^2 - f^2\right]^{1/2} = \sqrt{\frac{2jf\lambda}{n_1}}\left(1 + \frac{j\lambda}{2n_1 f}\right)^{1/2},$$

where f is an object focal length of the liquid crystal cell when the liquid crystal unit has a minimum refractive index relative to the incident polarized light.

2. The liquid crystal cell according to claim 1, wherein in a jth grating unit, a width of the step on the first section is $$t_{j,1} = d_{j,1} - \sum_{i=1}^{m-1} \frac{d_{j,2}}{2^i},$$

and a width of the step on the second section is $$t_{j,2} = \frac{d_{j,2}}{N/2},$$

where j is a positive integer less than or equal to M, $d_{j,1} = r_{j,1} - r_{j-1,2}$, and $d_{j,2} = r_{j,2} - r_{j,1}$.

3. The liquid crystal cell according to claim 1, wherein one of the first electrode layer and the second electrode layer close to the diffraction phase grating array comprises a plurality of electrode strips.

4. The liquid crystal cell according to claim 1, wherein the first electrode layer and the second electrode layer each comprise a transparent electrode.

5. The liquid crystal cell according to claim 1, wherein by controlling whether a predetermined voltage is applied to the first electrode layer and the second electrode layer, a refractive index of the liquid crystal unit relative to the incident polarized light switches between a minimum refractive index and a maximum refractive index, wherein the maximum refractive index is equal to a refractive index of the first substrate relative to the incident polarized light.

6. The liquid crystal cell according to claim 1, further comprising a polarizer on a light incident side of the liquid crystal cell, wherein the incident polarized light is formed through the polarizer.

7. A display comprising:
a display panel, and
a liquid crystal disposed above the display panel, comprising:
a first substrate; and
a second substrate facing the first substrate;
wherein the first substrate is configured to be formed with a diffraction phase grating array on a surface thereof close to the second substrate, and the diffraction phase grating array is filled with liquid crystal units, wherein the second substrate is configured to comprise a first electrode layer, an insulating layer, and a second electrode layer stacked on a side thereof close to the first substrate, wherein the diffraction phase grating array is configured to comprise a plurality of first phase grating groups and second phase grating groups arranged periodically, and the first phase grating groups and the second phase grating groups are symmetrically distributed relative to a center line of the liquid crystal cell, wherein the first phase grating groups and the second phase grating groups each comprise first to Mth grating units, where M is a positive integer, wherein each of the grating units comprises N steps, where N is $2^m$, and m is a positive integer, and a phase difference between adjacent steps is $2\pi/N$, and a step height is $$h = \frac{\lambda/N}{n_1 - n_o},$$

where $\lambda$ is a wavelength of incident polarized light, $n_1$ is a refractive index of the first substrate, and $n_o$ is a minimum refractive index of the liquid crystal unit relative to the incident polarized light, wherein each of the grating units has a first section and a second section, and the first section of each of the grating units has one step, and the second section of each of the grating units has N-1 steps, and wherein a distance from an outermost side of the first section to a center line of the liquid crystal cell is $r_{j,1}$, and a distance from an outermost side of the second section to the center line of the liquid crystal cell is $r_{j,2}$, and $$r_{j,1} = \left[\left(f + \frac{(2j-1)\lambda/2}{n_1}\right)^2 - f^2\right]^{1/2} = \sqrt{\frac{(2j-1)f\lambda}{n_1}}\left(1 + \frac{(2j-1)\lambda}{4n_1 f}\right)^{1/2},$$

$$r_{j,2} = \left[\left(f + \frac{j\lambda}{n_1}\right)^2 - f^2\right]^{1/2} = \sqrt{\frac{2if\lambda}{n_1}}\left(1 + \frac{j\lambda}{2n_1 f}\right)^{1/2},$$

where f is an object focal length of the liquid crystal cell when the liquid crystal unit has a minimum refractive index relative to the incident polarized light.

8. An electronic device, comprising a display, the display comprising:
a display panel, and
a liquid crystal disposed above the display panel, comprising:
a first substrate; and
a second substrate facing the first substrate;
wherein the first substrate is configured to be formed with a diffraction phase grating array on a surface thereof close to the second substrate, and the diffraction phase grating array is filled with liquid crystal units, and
wherein the second substrate is configured to comprise a first electrode layer, an insulating layer and a second electrode layer stacked on a side thereof close to the first substrate
wherein the diffraction phase grating array is configured to comprise a plurality of first phase grating groups and second phase grating groups arranged periodically, and the first phase grating groups and the second phase grating groups are symmetrically distributed relative to a center line of the liquid crystal cell, wherein the first phase grating groups and the second phase grating groups each comprise first to Mth grating units, where M is a positive integer, wherein each of the grating units comprises N steps, where N is $2^m$, and m is a positive integer, and a phase difference between adjacent steps is $2\pi/N$, and a step height is $$h = \frac{\lambda/N}{n_1 - n_o},$$

where $\lambda$ is a wavelength of incident polarized light, $n_1$ is a refractive index of the first substrate, and $n_o$ is a minimum refractive index of the liquid crystal unit relative to the incident polarized light, wherein each of the grating units has a first section and a second section, and the first section of each of the grating units has one step, and the second section of each of the grating units has N-1 steps, and wherein a distance from an outermost side of the first section to a center line of the liquid crystal cell is $r_{j,1}$, and a distance from an outermost side of the second section to the center line of the liquid crystal cell is $r_{j,2}$, and $$r_{j,1} = \left[\left(f + \frac{(2j-1)\lambda/2}{n_1}\right)^2 - f^2\right]^{1/2} = \sqrt{\frac{(2j-1)f\lambda}{n_1}}\left(1 + \frac{(2j-1)\lambda}{4n_1 f}\right)^{1/2},$$

$$r_{j,2} = \left[\left(f + \frac{j\lambda}{n_1}\right)^2 - f^2\right]^{1/2} = \sqrt{\frac{2if\lambda}{n_1}}\left(1 + \frac{j\lambda}{2n_1 f}\right)^{1/2},$$

where f is an object focal length of the liquid crystal cell when the liquid crystal unit has a minimum refractive index relative to the incident polarized light.

* * * * *

UNITED STATES PATENT AND TRADEMARK OFFICE
CERTIFICATE OF CORRECTION

PATENT NO. : 10,969,650 B2  
APPLICATION NO. : 16/329896  
DATED : April 6, 2021  
INVENTOR(S) : Jian Gao et al.

Page 1 of 1

It is certified that error appears in the above-identified patent and that said Letters Patent is hereby corrected as shown below:

In the Claims

Column 12, Line 42, Claim 1, delete "layer and" and insert -- layer, and --

Column 14, Line 45, Claim 7, Delete " $\sqrt{\dfrac{2if\lambda}{n_1}}$ " and insert -- $\sqrt{\dfrac{2jf\lambda}{n_1}}$ --

Column 14, Line 65, Claim 8, Delete "substrate" and insert -- substrate, --

Column 16, Line 15, Claim 8, Delete " $\sqrt{\dfrac{2if\lambda}{n_1}}$ " and insert -- $\sqrt{\dfrac{2jf\lambda}{n_1}}$ --

Signed and Sealed this  
Sixth Day of July, 2021

Drew Hirshfeld  
*Performing the Functions and Duties of the*  
*Under Secretary of Commerce for Intellectual Property and*  
*Director of the United States Patent and Trademark Office*